US010829994B2

(12) United States Patent
Penn et al.

(10) Patent No.: US 10,829,994 B2
(45) Date of Patent: Nov. 10, 2020

(54) DRILLING DIRECT CONTROL USER INTERFACE

(71) Applicant: National Oilwell Varco, L.P., Houston, TX (US)

(72) Inventors: Mark Penn, Katy, TX (US); Michael Porche, Round Rock, TX (US); Reza Banirazi-Motlagh, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 84 days.

(21) Appl. No.: 16/042,400

(22) Filed: Jul. 23, 2018

(65) Prior Publication Data

US 2018/0328113 A1 Nov. 15, 2018

Related U.S. Application Data

(63) Continuation of application No. 14/627,581, filed on Feb. 20, 2015, now Pat. No. 10,054,917.

(60) Provisional application No. 62/097,644, filed on Dec. 30, 2014.

(51) Int. Cl.
| | |
|---|---|
| *E21B 7/04* | (2006.01) |
| *G05B 15/02* | (2006.01) |
| *E21B 44/00* | (2006.01) |
| *E21B 47/022* | (2012.01) |

(52) U.S. Cl.
CPC ............... *E21B 7/04* (2013.01); *E21B 44/00* (2013.01); *E21B 47/022* (2013.01); *G05B 15/02* (2013.01)

(58) Field of Classification Search
CPC ..................................................... E21B 7/04
USPC ............................................................ 175/45
See application file for complete search history.

(56) References Cited

U.S. PATENT DOCUMENTS

| | | | |
|---|---|---|---|
| 4,733,733 | A | 3/1988 | Bradley et al. |
| 6,092,610 | A | 7/2000 | Kosmala et al. |
| 6,389,360 | B1 | 5/2002 | Alft et al. |
| 7,823,655 | B2 | 11/2010 | Boone et al. |
| 8,210,283 | B1 | 7/2012 | Benson |
| 2006/0212224 | A1 | 9/2006 | Jogi et al. |

(Continued)

FOREIGN PATENT DOCUMENTS

WO 2013082498 6/2013

OTHER PUBLICATIONS

Jucker, C., Extended European Search Report, dated Apr. 19, 2018, European Patent Office.

(Continued)

*Primary Examiner* — Taras P Bemko
(74) *Attorney, Agent, or Firm* — Blank Rome LLP

(57) ABSTRACT

Disclosed are control apparatus and methods for direct control in automated drilling. The control apparatus can include a display, a control unit, and an input device for receiving a plurality of measurements comprising one or more of present depth, present bit position, inclination, azimuth, top drive position, magnetic toolface, gravity toolface, a target control parameter. The control apparatus is configured to generate a drill string position indicator relating to a present depth and a present bit position. The control unit is configured to generate a vertical bar graph inclination indicator and a horizontal bar graph display azimuth indicator. The control unit is configured to generate a top drive position index. The control unit is configured to generate a toolface rosebud and a control parameter display. The control unit is configured to iteratively update the display in substantially real time.

17 Claims, 9 Drawing Sheets

(56) References Cited

U.S. PATENT DOCUMENTS

| | | |
|---|---|---|
| 2007/0257812 A1 | 11/2007 | Lasater et al. |
| 2008/0135290 A1 | 6/2008 | Hopwood et al. |
| 2009/0000823 A1 | 1/2009 | Pirovolou |
| 2009/0090555 A1 | 4/2009 | Boone et al. |
| 2009/0205867 A1 | 8/2009 | Reckmann et al. |
| 2012/0005542 A1 | 1/2012 | Petersen |
| 2012/0318578 A1 | 12/2012 | Schumacher |
| 2013/0341091 A1 | 12/2013 | Sugiura |
| 2014/0231141 A1 | 8/2014 | Hay et al. |

OTHER PUBLICATIONS

International Search Report and Written Opinion issued in corresponding International Application No. PCT/US15/67865 dated Mar. 18, 2016.

DRILLING DIRECT CONTROL USER INTERFACE

CROSS REFERENCE TO RELATED APPLICATIONS

This application is a continuation of U.S. application Ser. No. 14/627,581, filed Feb. 20, 2015, titled "DRILLING DIRECT CONTROL USER INTERFACE," which claims priority to, and the benefit of, U.S. Provisional Application No. 62/097,644, filed Dec. 30, 2014, titled "DRILLING DIRECT CONTROL USER INTERFACE," all of which are incorporated by reference herein in their entirety.

BACKGROUND

This disclosure relates generally to methods and apparatus for drilling control and information systems. More specifically, this disclosure relates to methods and apparatus for providing drilling control and information systems that may interface with a plurality of control and information applications to support a variety of control and information functions through a common infrastructure. The common control infrastructure may be configured to acquire data from multiple sources, communicate that data with a plurality of control modules or information interfaces, and provide operating instructions to multiple drilling components, all at a relatively high data rate over wired pipe.

To recover hydrocarbons from subterranean formations, wells are generally constructed by drilling into the formation using a rotating drill bit attached to a drill string. A fluid, commonly known as drilling mud, is circulated down through the drill string to lubricate the drill bit and carry cuttings out of the well as the fluid returns to the surface. The particular methods and equipment used to construct a particular well may vary extensively based on the environment and formation in which the well is being drilled. Many different types of equipment and systems are used in the construction of wells including, but not limited to, rotating equipment for rotating the drill bit, hoisting equipment for lifting the drill string, pipe handling systems for handling tubulars used in construction of the well, including the pipe that makes up the drill string, pressure control equipment for controlling wellbore pressure, mud pumps and mud cleaning equipment for handling the drilling mud, directional drilling systems, and various downhole tools.

The overall efficiency of constructing a well generally depends on all of these systems operating together efficiently and in concert with the requirements in the well to effectively drill any given formation. One issue faced in the construction of wells is that maximizing the efficiency of one system may have undesirable effects on other systems. For example, increasing the weight acting on the drill bit, known as weight on bit (WOB), may often result in an increased rate of penetration (ROP) and faster drilling but may also decrease the life of the drill bit, which may increase drilling time due to having to more frequently replace the drill bit. Therefore, the performance of each system being used in constructing a well must be considered as part of the entire system in order to safely and efficiently construct the well.

Many conventional automated drilling systems are "closed loop" systems that attempt to improve the drilling process by sensing a limited number of conditions and adjusting system performance, manually or automatically, based upon the sensed conditions. Often these closed loop systems don't have the ability to monitor or consider the performance of all of the other systems being used or adjust the performance of multiple systems simultaneously. It is therefore left to human intervention to ensure that the entire system operates efficiently/satisfactorily.

Relying on human intervention may become complicated due to the fact that multiple parties are often involved in well construction. For example, constructing a single well will often involve the owner of the well, a drilling contractor tasked with drilling well, and a multitude of other companies that provide specialized tools and services for the construction of the well. Because of the significant coordination and cooperation that is required to integrate multiple systems from multiple companies, significant human intervention is required for efficient operation. Integrating multiple systems and companies becomes increasingly problematic as drilling processes advance in complexity.

Thus, there is a continuing need in the art for methods and apparatus for controlling drilling processes that overcome these and other limitations of the prior art.

BRIEF SUMMARY OF THE DISCLOSURE

Herein disclosed are systems and methods for direct control in automated drilling.

Herein also is disclosed a control apparatus for automated directional drilling with a downhole tool on a tool string including a wired drill pipe. The control apparatus can include a display. The control apparatus can also include an input device for receiving a plurality of measurements comprising one or more of present depth, present bit position, inclination, azimuth, top drive position, magnetic toolface, gravity toolface, a target control parameter. The control apparatus can also include at least one control unit that controls information to be displayed on the display. The control apparatus is configured to generate a drill string position indicator relating to a present depth and a present bit position. The control unit is configured to generate an inclination indicator shown as a vertical bar graph display and an azimuth indicator shown as a horizontal bar graph display. The control unit is configured to generate a top drive position index shown as a spiral and a digital display. The control unit is configured to generate a toolface rosebud. The control unit is configured to generate a control parameter display. The control unit is configured to iteratively update the display with the drill string position indicator, the inclination indicator, the azimuth indicator, the top drive position index, the toolface rosebud, and the control parameter display in substantially real time.

Herein also is disclosed a drilling rig for automated directional drilling with a downhole tool on a tool string including a wired drill pipe. The drilling rig can include a drilling unit for directional drilling including a downhole tool disposed on a tool string including wired drill pipe and a control apparatus. The control apparatus can include a display. The control apparatus can also include an input device for receiving a plurality of measurements comprising one or more of present depth, present bit position, inclination, azimuth, top drive position, magnetic toolface, gravity toolface, a target control parameter. The control apparatus can also include at least one control unit that controls information to be displayed on the display. The control apparatus is configured to generate a drill string position indicator relating to a present depth and a present bit position. The control unit is configured to generate an inclination indicator shown as a vertical bar graph display and an azimuth indicator shown as a horizontal bar graph display. The control unit is configured to generate a top drive position index shown as a spiral and a digital display. The control unit is configured to generate a toolface rosebud. The control unit is configured to generate a control parameter display. The control unit is configured to iteratively update the display with the drill string position indicator, the inclination indicator, the azimuth indicator, the top drive position index, the toolface rosebud, and the control parameter display in substantially real time.

Herein also is disclosed a computer-implemented method of monitoring a directional drilling operation. The method can include receiving a data stream from a drilling rig, the data stream including a plurality of real time sensor logs associated with the operation of a drill string used in the drilling operation. The method can also include processing the received data stream to generate a computerized current case record including data representing a current drilling status. The method can also include providing a visual display of the current drilling status. The visual display includes a drill string position indicator relating to a present depth and a present bit position. The visual display also includes an inclination indicator shown as a vertical bar graph display. The visual display includes an azimuth indicator shown as a horizontal bar graph display. The visual display includes a top drive position index shown as a spiral and a digital display. The visual display includes a toolface rosebud. The visual display includes a control parameter display. The method includes repeating the steps above over time, thereby updating the visual display throughout the drilling operation.

BRIEF DESCRIPTION OF THE DRAWINGS

For a more detailed description of the embodiments of the present disclosure, reference will now be made to the accompanying drawings.

DETAILED DESCRIPTION

Figure 1:
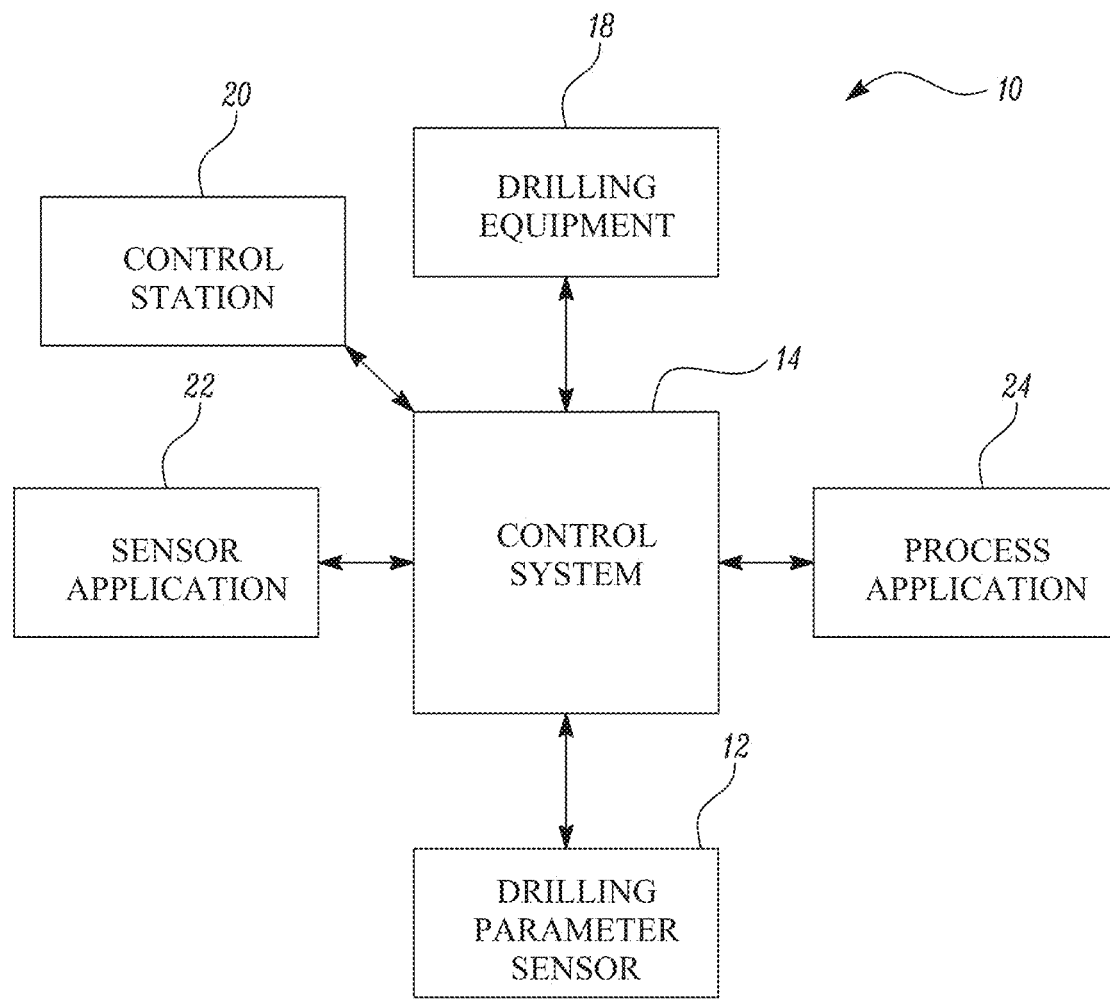
FIG. 1 is a simplified diagram of an automatic drilling system.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein. For the purposes of this application, the term "real-time" means without significant delay.

Referring initially to FIG. 1, automated drilling system 10 can include a drilling parameter sensor 12 that is bidirectional communication with a control system 14 via a high-speed communication system 16 that can be capable of real-time, or near real-time communication. The drilling parameter sensor 12 can be any sensor operable to sense at least one drilling parameter and provide raw data regarding the drilling parameter to the control system 14. The drilling parameter sensor 12 may also be configured to receive operating instructions from the control system 14.

The drilling parameter sensor 12 can be mounted to any location necessary to sense the drilling parameter being monitored. For example, drilling parameter sensor 12 may be a downhole sensor or a rig-mounted sensor. A downhole drilling parameter sensor 12 may be disposed at the bottom hole assembly (BHA) or at any location along a drillstring and may include sensors for measuring downhole drilling parameters including, but not limited to, WOB, torque, revolutions per minute (RPM), temperature, vibration, acceleration, pressure, formation characterization, borehole condition, and drilling fluid condition. A rig-mounted drilling parameter sensor 12 may be configured to monitor a component of the drilling system, including, but not limited to, top drives, draw works, pipe handling equipment, pressure control equipment, mud cleaning equipment, pumps, blow out preventers, iron roughnecks, pipe rackers, centrifuges, shakers, heave compensators, dynamic positioning systems, accumulators, and valves, to measure one or more drilling parameters including, but not limited to, WOB, torque, revolutions per minute (RPM), temperature, vibration, acceleration, and pressure.

The control system 14 can also be in bidirectional communication with the drilling components 18 via a networked (wired or wireless is not specifically relevant) communication system. The control system 14 can provide operating instructions to the drilling components 18 in response to drilling parameters sensed by the drilling parameter sensors 12. The drilling components 18 can include, but are not limited to, top drives, draw works, pipe handling equipment, pressure control equipment, mud cleaning equipment, pumps, blow out preventers, iron roughnecks, pipe rackers, centrifuges, shakers, heave compensators, dynamic positioning systems, accumulators, and valves. The drilling components 18 can include one or more sensors that can monitor the performance of the equipment and provide feedback of the performance of the equipment to the control system 14.

The sensor application 22 and process application 24 can be in bidirectional communication with the control system 14. The sensor application 22 and the process application 24 are operable work with the control system 14 to process data received from the drilling parameter sensor 12, and other sensors, and provide operating instructions to one or more drilling component 18. In this manner, automated drilling system 10 allows the drilling process to be controlled and executed as well as adjusted and adapted using verification or command data collected by the drilling parameter sensor 12 or third party system.

In operation, the raw data collected by the drilling parameter sensor 12 is relayed by the communication system 16 to the control system 14. This data then enters the control system 14 where it is prioritized and distributed to one or more sensor applications 22. The data from a single drilling parameter sensor 12 may be provided to one or more sensor applications 22. Likewise, a single sensor application 22 may receive data from one or more drilling parameter sensors 12. The sensor application 22 can process the data received by the drilling parameter sensor 12, or by other sensors, and communicate the processed data back to the control system 14.

The control system 14 prioritizes and distributes the processed data to one or more process applications 24. The processed data can be received by one or more process applications 24 that can generate an instruction to modify an operating parameter of one or more drilling components 18. The process applications 24 receive data, including, but not limited to, data processed by the sensor applications 22, and analyze that data in order to evaluate the performance of the drilling components and issue instructions to modify the operating parameters of one or more drilling components 18 as needed. For example, a process application 24 can be configured to provide instructions to the drilling components 18 to manage surface WOB, torque, and RPM in response to downhole WOB, downhole torque and downhole vibration data collected by the drilling parameter sensor 12. Other process applications 24 can include, but are not limited to applications for managing control hole cleaning, equivalent circulating density (ECD) management, managed pressure drilling (MPD), kick detection, directional drilling, and drilling efficiency.

The control station 20 can be in bidirectional communication with the control system 14 and provide a user interface that can be accessed by an operator on the rig or in a remote location. The control station 20 provides a location for providing manual input to the control system 14 and for manual override of the control system 14 if needed. The control station 20 can provide visual representation of the operation of the system including the status of one or more drilling components 18 and a real-time representation of data received from the drilling parameter sensors 12.

Automated drilling system 10 provides a customizable, open concept control system where customized sensor applications 22 and/or process applications 24 allow the drilling process to be tailored to meet the specific needs of drilling contractors and rig operators. Automated drilling system 10 allows a plurality of sensor applications 22 and/or process applications 24 to be developed and selectively integrated into the control system 14 as needed. This enables the automated drilling system 10 to be easily adapted for a variety of implementations.

Figure 2:
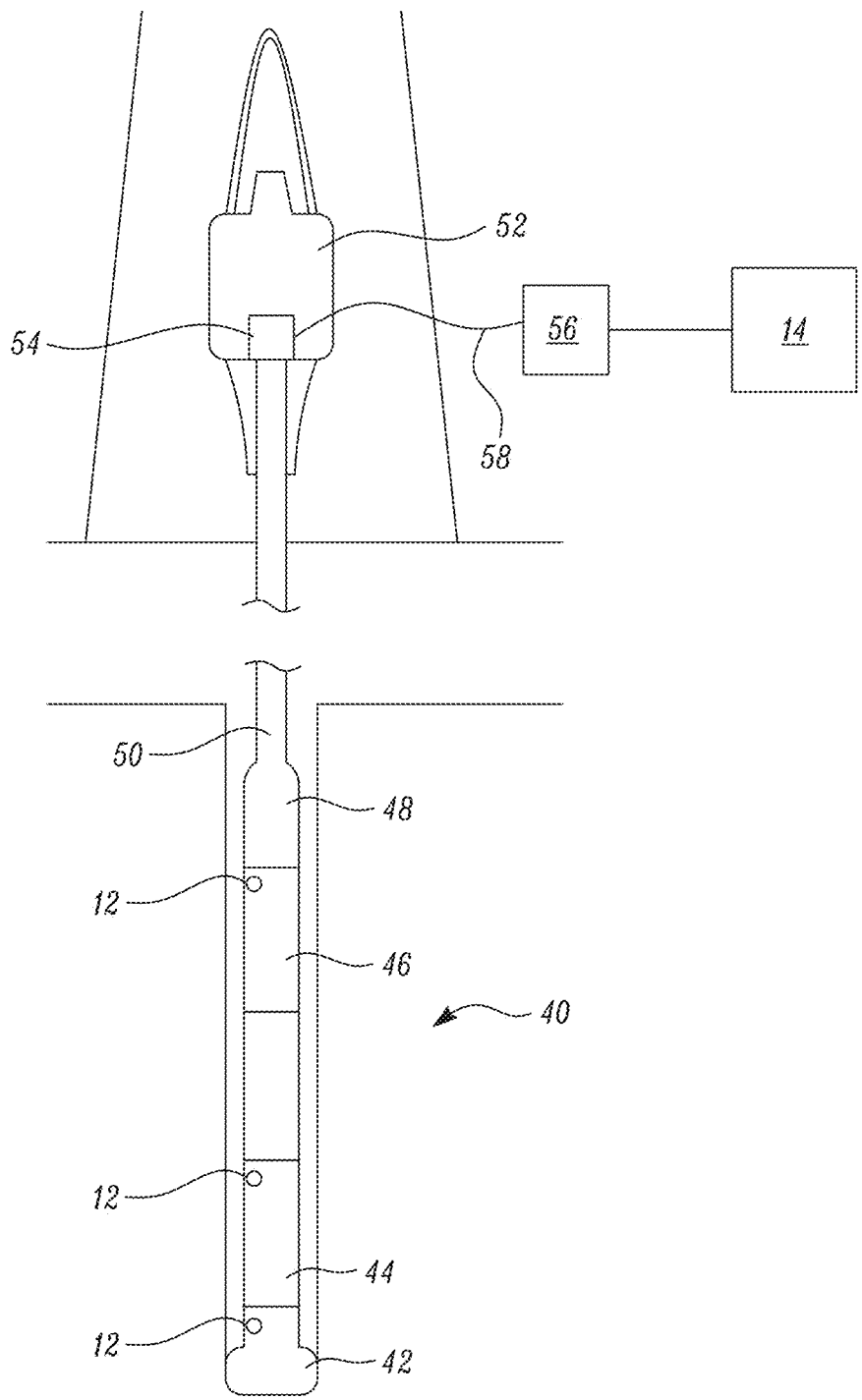
FIG. 2 is a simplified schematic diagram of a drill string used as part of an automatic drilling system.

Referring now to FIG. 2, an exemplary BHA 40 can include a bit 42, a drive system 44, a sensor module 46, and a communication sub 48. The BHA 40 can be coupled to the rotating system, 52, or other surface equipment, via drill pipe 50. The bit 42, the drive system 44, the sensor module 46, and the drill pipe 50 can each include one or more drilling parameter sensors 12 to measure a selected drilling parameter, including, but not limited to, WOB, torque, RPM, temperature, vibration, acceleration, and pressure.

The drilling parameter sensors 12 can be in bidirectional communication with the communication sub 48 via a wired or wireless connection. The communication sub 48 can be operable to receive data collected from each of the drilling parameter sensors 12 and transmit the data to the surface via communication system 16. The communications sub 48 can also be operable to receive control signals and other signals from the surface and relay those signals to one or more sensors 12 or other tools within the BHA 40.

The communication system 16 can be any system suitable for the transmission of data and other signals between the BHA 40 to the surface at relatively high rates of speed. In certain embodiments, the communication system 16 supports continuous, real-time communication between the BHA 40 and the surface. Suitable communication systems 16 can utilize communication methods that include, but are not limited to, electric signals along wired drill pipe, mud-pulse telemetry, fiber optics, wireless signals, acoustic signals, and electromagnetic signals.

The data transmitted from the BHA 40 can be received at the surface by surface communications link 54. The surface communications link 54 may be integrated into a component such as a swivel, internal blow out preventer (IBOP), or into an instrumented saver sub coupled to the drill string. The surface communications link 54 can be configured to transmit data to the communication controller 56 via a wired or wireless link 58. The communication controller 56 can be coupled to the control system 14 and operable to manage the flow of data between the control system 14 and the surface communications link 54. The communications controller 56 can also be in bidirectional communication with other sensors located at the surface, including sensors mounted on drilling components 18.

Figure 3:
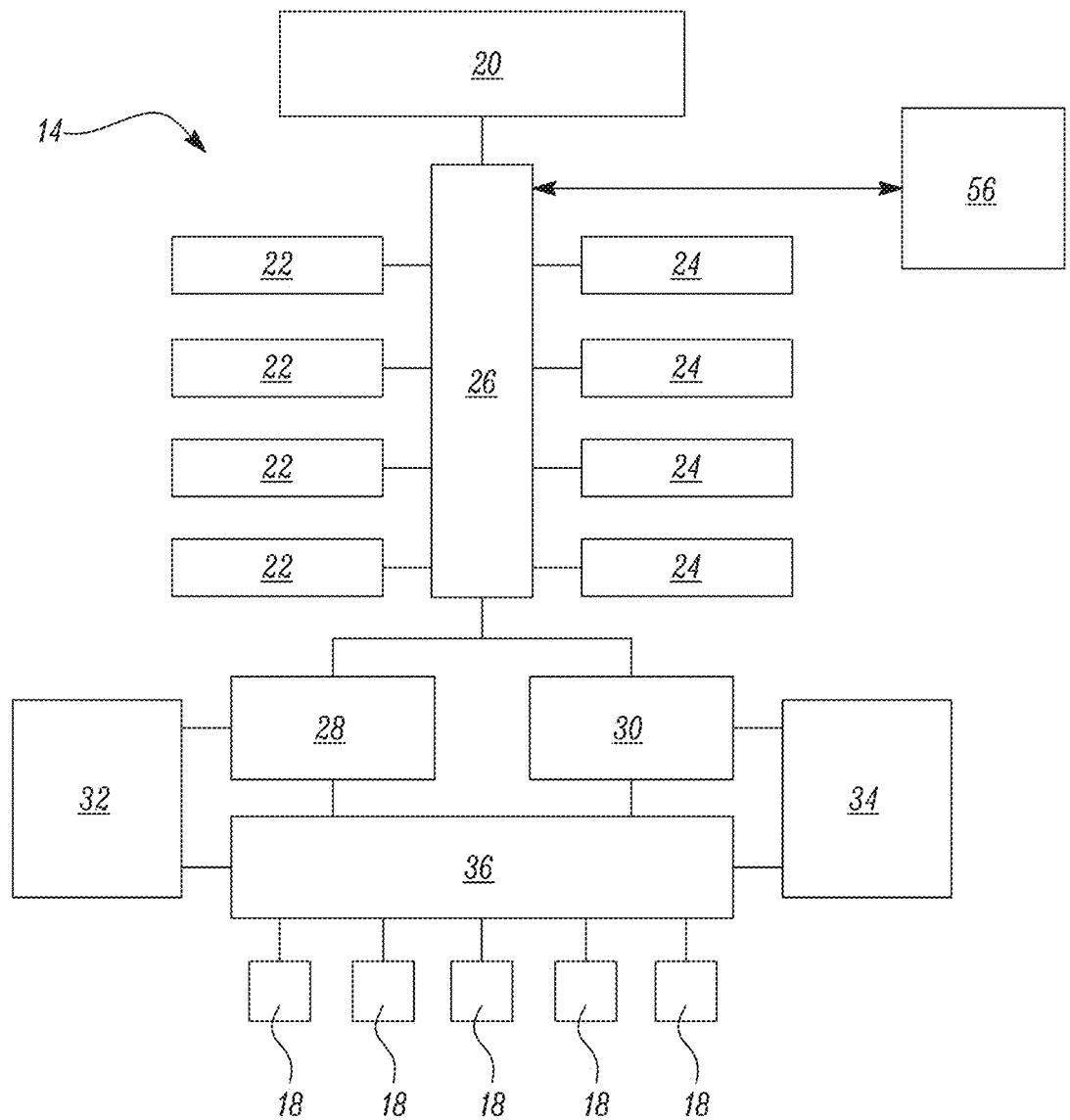
FIG. 3 is a simplified diagram of a control system for an automatic drilling system.

Referring now to FIG. 3, the control system 14 can include an internal communication bus 26, a network interface 28, a priority controller 30, data storage 32, a simulator interface 34, and a hardware controller 36. The internal communication bus 26 can also be in bidirectional communication with one or more sensor applications 22, one or more process applications 24, a control station 20, and communication controller 56. The network interface 28 can also be in bidirectional communication with external sources and users of information so that drilling operations and rig performance can be remotely monitored and controlled.

In operation, raw data from drilling parameter sensors 12, and other sources, is received by internal communication bus 26 via communication controller 56. The internal communication bus 26 sends the data to the network interface 28. The network interface 28 receives raw data from the plurality of drilling parameter sensors 12, other sensors, and from external sources, such as offsite engineering or technical experts. The network interface 28 categorizes and sorts this data and then distributes the data back through the internal communication bus 26 to the sensor applications 22 and/or process applications 24 that can process that data.

In order to provide flexibility and support the use of the control system 14 with a variety of drilling and completion operations, the control system 14 can be configured with customized sensor applications 22 and process applications 24 as needed for the particular operation. This allows control system 14 to be easily customized for use with specific drilling parameter sensors and the equipment available on a specific rig. If the rig equipment or drilling parameter sensors are changed, the corresponding applications on the control system 14 can also be changed without having to reprogram the entire control system.

The sensor application 22 can be operable to receive raw data from one or more drilling parameter sensors 12, or other sensors, and generate processed data. The sensor application 22 can be operable to generate processed data representing downhole conditions including, but not limited to, WOB, torque, RPM, temperature, vibration, acceleration, and pressure. The processed data is then transmitted by internal communication bus 26 to the process applications 24 that can utilize the processed data to generate an instruction.

The processed data can be received by one or more process applications 24 that can generate an instruction that may modify an operating parameter of one or more drilling components 18, display a status of the drilling operation, or cause another function to be performed. The process applications 24 receive data, including, but not limited to, data processed by the sensor applications 22, and analyze that data in order to evaluate the performance of the drilling components and issue instructions to modify the operating parameters of one or more drilling components 18 as needed. For example, a process application 24 can be configured to provide instructions to the drilling components 18 to manage surface WOB, torque, and RPM in response to downhole WOB, downhole torque and downhole vibration data collected by a drilling parameter sensor 12. Other process applications 24 can include, but are not limited to, applications for managing control hole cleaning, equivalent circulating density (ECD) management, managed pressure drilling (MPD), kick detection, directional drilling, and drilling efficiency.

Multiple sensor applications 22 and process applications 24 can simultaneously be in bidirectional communication with the control system 14. As described above, the sensor applications 22 and/or the process applications 24 can analyze and/or process collected data to generate an answer, which can include an instruction, measurement, operating condition, data point, or other information. Instructions generated by the process applications are then transmitted to the priority controller 30.

The priority controller 30 monitors the performance of the entire drilling process and determines if the instructions generated by the process applications 24 can be implemented. For example, if a process application 24 generates an instruction for a drilling component to perform a certain function, the priority controller 30 determines if that function can be safely performed. Once an instruction has been cleared by the priority controller 30, that answer released by the priority controller 30 and can be sent to the hardware controller 36 or other component of the control system. The needs of the drilling operation will be given priority after the system has assessed priority, solely as an example a priority plan could be listed as follows: (1) safety considerations as defined by on site conditions; (2) machine limitations (could be assessed based on work yet to be done before maintenance is to be performed and available materials to maintain) as may be defined by equipment suppliers and supply chain; (3) well restrictions to avoid collapse or fracture as may be defined by the geologist and verified by defined on site personnel; (4) formation target accuracy as may be defined by the directional driller; (5) rate of penetration as may be defined by the company man; and (6) quality of well as may be defined by the petrophysicist.

Once the instruction has been released by the priority controller 30, it can be routed to one or more of the hardware controller 36, simulator interface 34, data storage 32, or other system components. The hardware controller 36, which can include one or more primary logic controllers and/or single board controllers, can provide operating instructions to one or more drilling components 18. Data storage 32 can store both raw and processed data as well as any instructions sent to the drilling components 18. The simulator interface 34 may receive all the instructions that hardware controller 36 sends to the drilling components 18 so that those instructions can be provided to a drilling simulator that can replicate the instructions and predict the outcome of the operation.

As noted previously, the control station 20 includes the user interface. The control station 20 can provide visual representation of the operation of the system including the status of one or more drilling components 18 and a real-time representation of data received from the drilling parameter sensors 12. A variety of indicators can be shown in the user interface of the control station 20 in accordance with embodiments of the present disclosure.

Figures 4, 5:
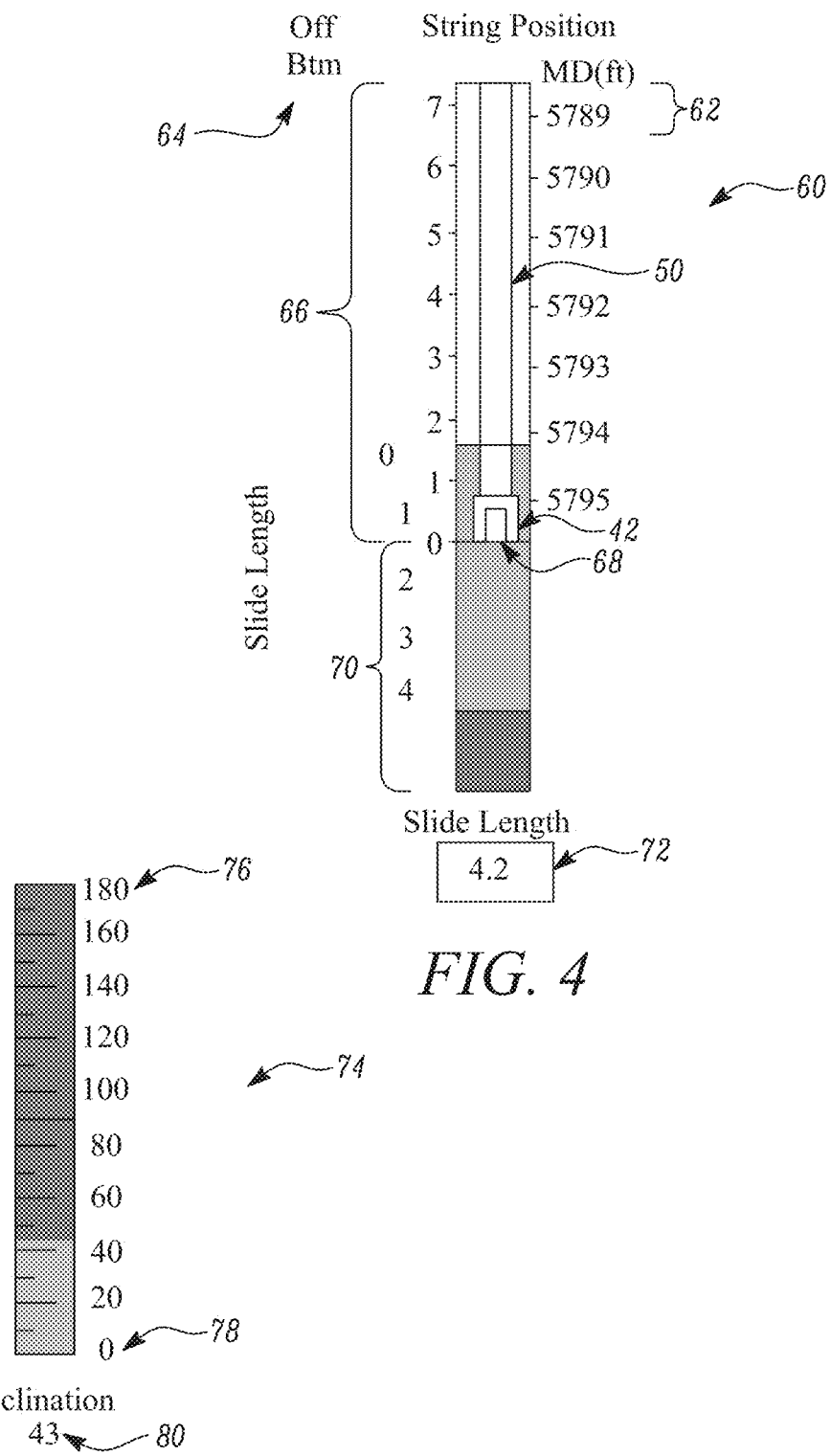
FIG. 4 is an example drill string position indicator 60 in accordance with an embodiment of the present disclosure.
FIG. 5 is an example inclination indicator in accordance with an embodiment of the present disclosure.

FIG. 4 is an example drill string position indicator 60 in accordance with an embodiment of the present disclosure. As shown, the drill string position indicator 60 can take the form of a vertical bar graph illustrating the depth and bit position at a present time. In an embodiment, the drill string position indicator 60 shows the depth at the end of the last stand of drill pipe 50 and on down to the drill stop point (i.e., Kelly down) for the current stand of pipe. Shown at top right of the vertical bar graph of FIG. 4, the current depth 62 in feet is shown. At top left of the vertical bar graph of FIG. 4, a moving scale 64 showing feet off bottom that is reflective of when the bit 42 is hoisted. The footage already drilled 66 can be shown indicated from the top of the vertical bar graph in a first color coded section. The slide length entry point 68 is also shown, and a slide length indicator 70 in a second color coded section. A digital slide length entry point 72 is provided at the bottom of the drill string position indicator 60, enabling a user to enter a particular slide length for a current slide, and the second color coded section displayed will iteratively update to reflect the slide length entered at the digital slide length entry point 72. In an embodiment, the iterative updates occur substantially in real time.

FIG. 5 is an example inclination indicator 74 in accordance with an embodiment of the present disclosure. As shown, the inclination indicator 74 can take the form of a vertical bar graph. As is well known in the field, inclination refers to the angle of the well bore defined by a tangent line and a vertical line parallel to the direction of earth's gravity. By industry standard, zero degree (0.degree.) inclination is vertical (downward pointing) and ninety degrees (90.degree.) inclination is horizontal. In the vertical bar graph of FIG. 5, a maximum 76 of one hundred eighty degrees (180.degree.) is shown at the top, and a minimum 78 of zero degrees (0.degree.) is shown at the bottom. A digital inclination indicator 80 is shown at the bottom below the visual representation. In an embodiment, the degree of inclination is shaded or color coded for efficient visual review by the user operator at a glance. In an embodiment, the inclination indicator 74 is updated in substantially real time based on one or more sensor measurements.

Figure 6:
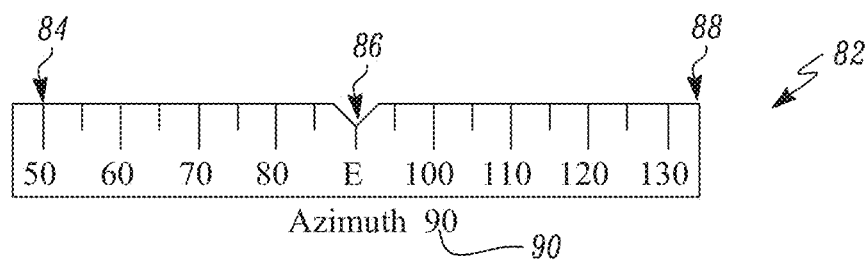
FIG. 6 is an example azimuth indicator in accordance with an embodiment of the present disclosure.

FIG. 6 is an example azimuth indicator 82 in accordance with an embodiment of the present disclosure. As shown, the azimuth indicator 82 can take the form of a horizontal bar graph. As is well known in the field, azimuth refers to the angle of the well bore direction as projected to a horizontal plane and relative to due north. By industry convention, zero degree (0.degree.) azimuth coincides with North, ninety degree (90.degree.) azimuth with East, one hundred eighty degree (180.degree.) azimuth with South, and two hundred seventy degree (270.degree.) azimuth with West. The horizontal bar graph includes a current value 86 for azimuth, shown centered in the horizontal bar graph, with a moving range of negative forty five degrees (−45.degree.), indicated as the lower range limit 84 and positive forty five degrees (+45.degree.), indicated as the upper range limit 88 about the current azimuth. Additionally, a digital azimuth indicator 90 may be shown just below the horizontal bar graph. In an embodiment, the azimuth indicator 82 is updated in substantially real time based on one or more sensor measurements.

Figure 7:
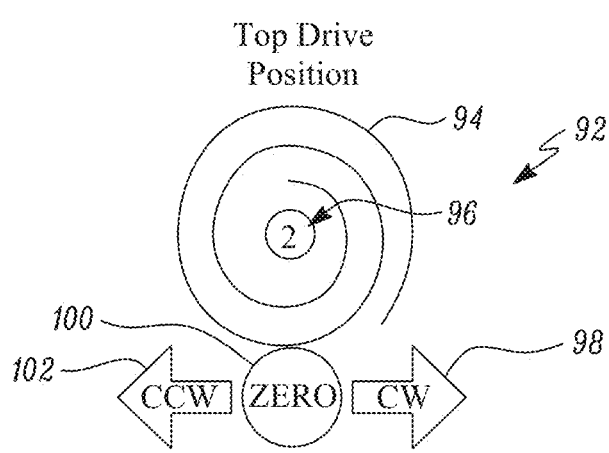
FIG. 7 is an example top drive position index in accordance with an embodiment of the present disclosure.

FIG. 7 is an example top drive position index 92 in accordance with an embodiment of the present disclosure. As noted previously, the drilling components 18 can include a top drive, that is, the mechanical device on a drilling rig that provides the clockwise torque to the drill string to facilitate the process of drilling a borehole. The top drive position index 92, as shown in FIG. 7, can include both a digital representation of the integer number 96 of full drill pipe rotations, as well as a spiral representation 94 of the number of full pipe rotations. In an embodiment, the top drive position index 92 is updated in substantially real time based on one or more sensor measurements. As shown in FIG. 7, the top drive position index 92 may also include entry controls, such as a re-indexing control 100 to reset the count of full drill pipe rotations to a value of zero, as well as a clockwise movement command indicator 98 and a counter clockwise movement command indicator 102, each of which allows a driller to manually adjust the top drive.

Figure 8:
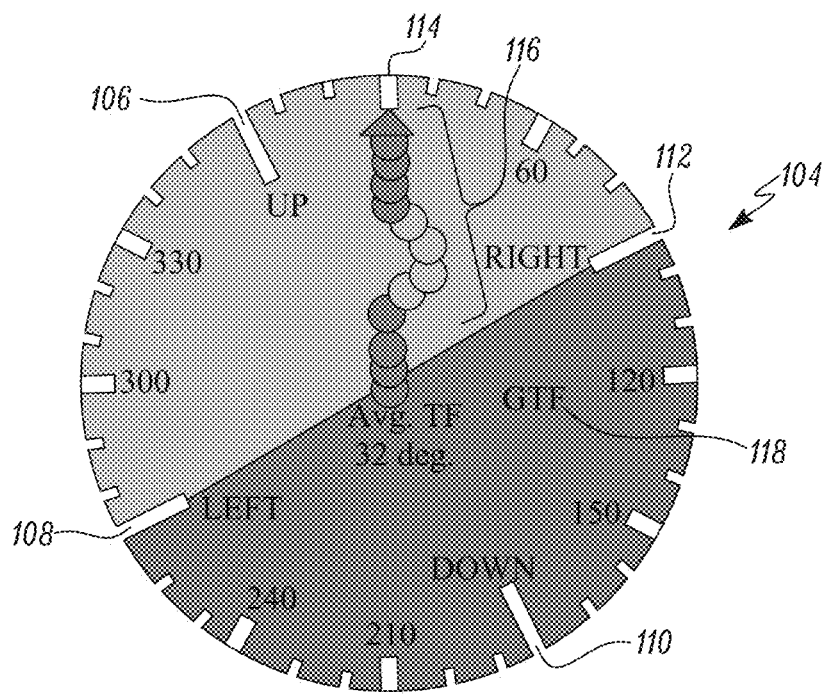
FIG. 8 is an example toolface rosebud in accordance with an embodiment of the present disclosure.

FIG. 8 is an example toolface rosebud 104 in accordance with an embodiment of the present disclosure. In an embodiment, the toolface rosebud 104 is circular, having a target toolface 114 positioned at the 12 o'clock position. In systems prior to the present disclosure, it was conventional to show the North ordinal in the 12 o'clock position. Each toolface position (116) displayed is displayed relative to the target tool face position. By displaying target tool face 114 in the 12 o'clock position on the toolface rosebud 104 rather than the North ordinal, deviation of toolface position 116 away from target toolface 114 is easily assessed at a glance.

The toolface rosebud 104 may be based on magnetic toolface or gravity toolface, and switching between magnetic or gravity may occur automatically without interaction by the user operator. At a position on the toolface rosebud 104, such as for example the 4 o'clock position, an indicator 118 can be provided that indicates whether the present display is based on magnetic toolface or gravity toolface. Likewise, the indicator in the toolface rosebud 104 (for example, again at the 4 o'clock position) may indicate "rotating" during times when the pipe is not sliding. As shown in FIG. 8, ordinals shall be designated N (106), S (110), E (112), W (108) for magnetic toolface and Up (106), Down (110), Left (108), and Right (112) for gravity tool face. The "upper" half of the toolface when in the gravity mode may be color coded different from the "lower" half. At the center of the toolface rosebud, a digital indicator of an integer number for average toolface may be displayed.

Visual evaluation of the toolface feedback may also be included a series of symbols, such as dots, asterisks, etc. displayed on the rosebud, with the closest symbols to the target toolface representing the more recent previous toolface values, and the symbols further from the target toolface representing the least recent previous toolface values. In a particular embodiment, the series symbols representing historical toolface values 116 may be color coded as indications of error from target. For example, some of the symbols can be displayed as green, if within fifteen degrees (15.degree.) of target, yellow if greater than fifteen degrees (15.degree.) but less than thirty degrees) (30.degree.), and red if more than thirty degrees (30.degree.). In such an embodiment, color coding and tolerances would be selectable by the operator for ease of readability. In an embodiment, the most recent toolface may be denoted by a differentiated symbol, shown as a triangle or arrow in the example of FIG. 8 while older historical toolface values are represented by circular dots.

Additionally, in an embodiment, the time over which toolface samples are displayed by be selected or entered by the user operator. Thus the operator might be able to display the most recent one, three, or five minutes. Similarly an option shall exist to display based upon footage, as the toolfaces for the last 1, 3, 5 or 10 feet.

Figure 9:
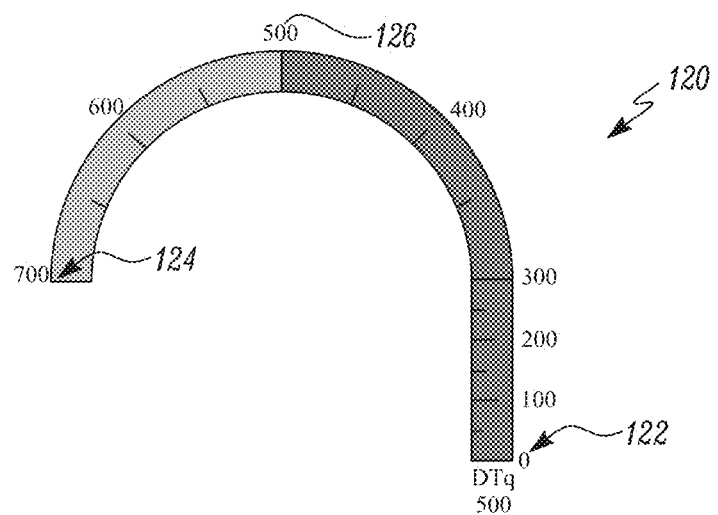
FIG. 9 is an example control parameter display in accordance with an embodiment of the present disclosure.

FIG. 9 is an example control parameter display 120 in accordance with an embodiment of the present disclosure. In an embodiment, the control parameter display 120 can take the form of a bent or curved bar graph for displaying a current value in a range for a particular control parameter. In a particular embodiment, the control parameter displayed in the control parameter display may be downhole torque. The target value 126 for the control parameter is positioned at the 12 o'clock position, with a range extending from the target control from the upper range limit 124 to the lower range limit 122. As shown in the particular example in FIG. 9, the downhole torque can range from 0 Psi to 700 Psi, with the target value being 500 Psi. Coded shading (such as color coding or patterned coding) fills the curved bar graph up to the current value, which as shown in FIG. 9, is also at 500 Psi. Scaling in the control parameter display 120 can be based on predicted angular displacement as from a comprehensive model, to show the effects of being less than, or greater than the parameter target value. In various embodiments, the scaling in the control parameter display 120 can adjust dynamically based on the comprehensive model, depending on the degree of deviation of the control parameter from the target value 126. As the scaling adjusts to show finer detail when the deviation of the control parameter from the target value is small, or to show less granular detail when the deviation increases, the user can obtain from the display a grasp of the direction and magnitude of changes needed to maintain or restore control in an efficient glance at the display. In an example, when the control parameter displayed in the control parameter display 120 is downhole torque, a comprehensive model of drill pipe characterization, or compliance, can be used to adjusting the scaling automatically in the control parameter display, thereby increasing the utility of the display to the user/driller.

The control parameter display may, as described with respect to other display units described herein, include color or pattern coding to show when the current value is below or exceeds the target value. For example, in an embodiment, indications greater than the parameter target but less than the maximum defined value can be color coded yellow, with value above the maximum color coded red. Other visual coding techniques are also contemplated as within the inventive concept, to the extent such coding enables fast visual assessment of the direction and magnitude of deviation from a view of the display in accordance with embodiments of the present disclosure.

Figure 10:
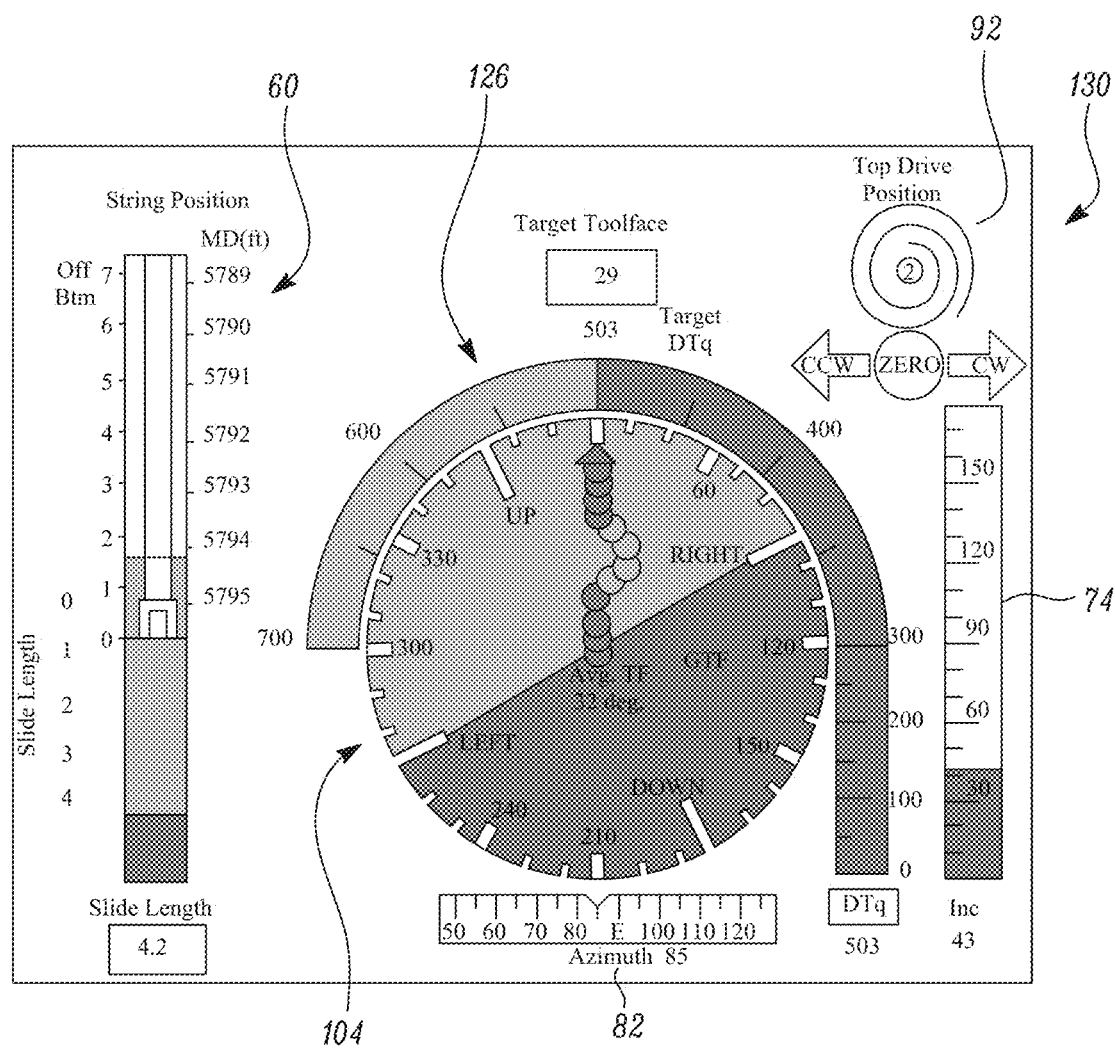
FIG. 10 is an example display in accordance with an embodiment of the present disclosure.

FIG. 10 is an example display 130 in accordance with an embodiment of the present disclosure. The example display of FIG. 10 combines the various display elements described with respect to FIG. 4-9 into an integrated operator display for providing all of the information displayed into a rapidly observable view of what is occurring in the drilling operation. The drill string position indicator 60 is provided at the far left. The Azimuth indicator 82 is provided below the toolface rosebud 104, and the curved control parameter display 120 is disposed about the toolface rosebud 104. The inclination indicator 74 is provided at the far right, with the top drive position index display 92 directly above. The precise relative placement of each of the display elements can vary from the example of FIG. 10; however, that the display elements are each provided together in a single integrated view is of utility to the drilling operator.

Other visual indicators may be provided to indicate different occurrences. If a loop besides the primary control loop is in control, for example if the WOB or ROP limit is limiting payoff so as to reduce the level of the primary control, then the bar graph may be displayed in an alternative color, instead of the standard color, in order to call attention to the control for the operator.

In another example, with the designated primary loop in control, the loop indicator at the bottom of the bent bar graph for the control parameter display may display such in black lettering with standard grey background. However if another loop takes control, as described above, the background of the label may change to an alert color (for example, turn yellow) and the controlling parameter shall be written with black lettering.

Figure 11:
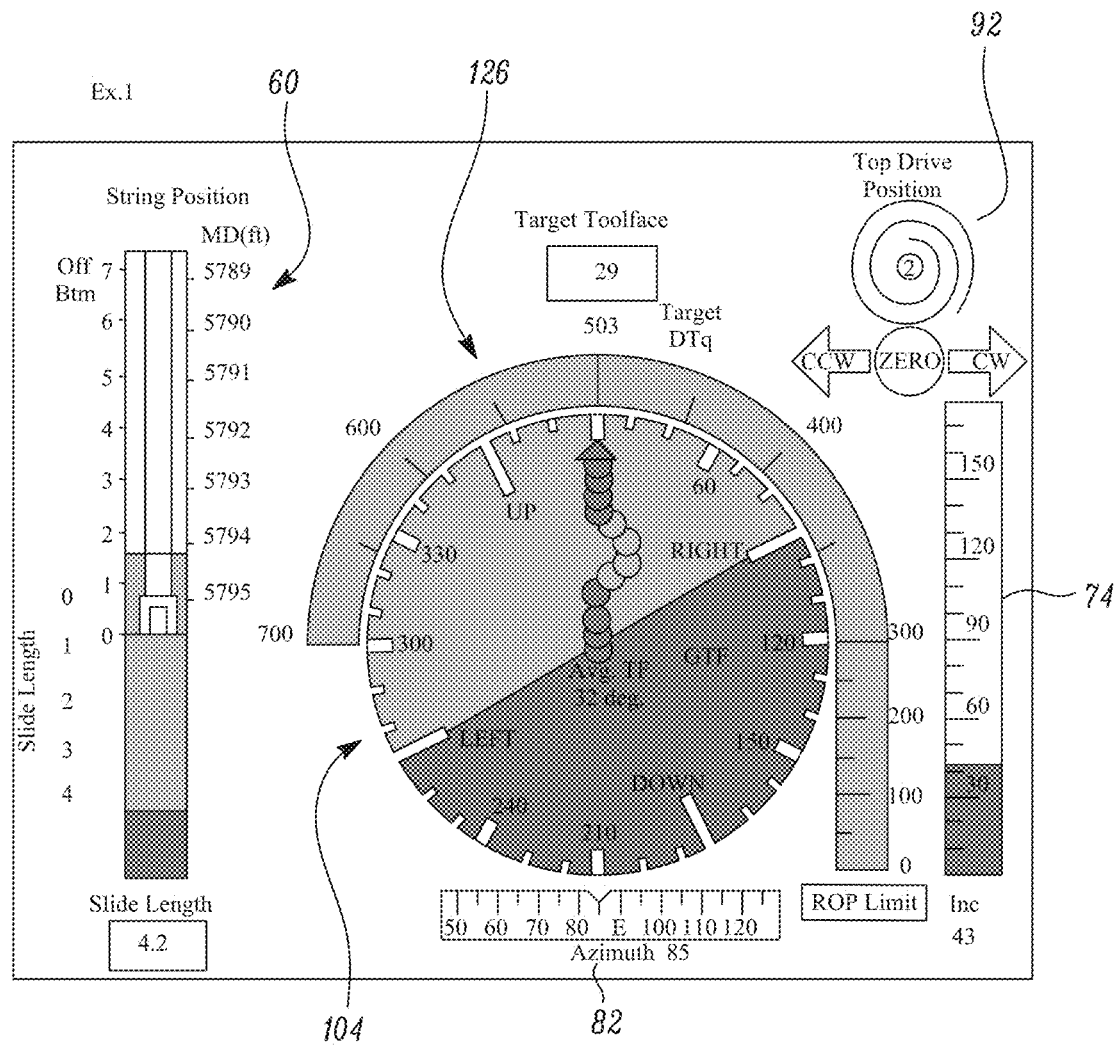
FIG. 11 is another example display in accordance with an embodiment of the present disclosure.

FIG. 11 is another example display in accordance with an embodiment of the present disclosure. This display illustrates what is displayed in a particular embodiment when the downhole torque has dropped off, which will eventually allow the toolface to walk clockwise. The primary parameter bar graph is shown in a second color instead of the usual color, indicating that the downhole torque (D Tq) loop is no longer in control, and the highlighting of the loop in the lower right hand corner indicates that it is indeed the ROP loop, and not the WOB loop for example, that is limiting downhole torque. The control parameter bar graph will continue to display the downhole torque (D Tq) value with the difference between its value and the 12 o'clock indicating the possible amount to the right the toolface might go if uncorrected. Also, the azimuth as recorded from the last toolface has changed to ninety five degrees (95.degree.).

Figure 12:
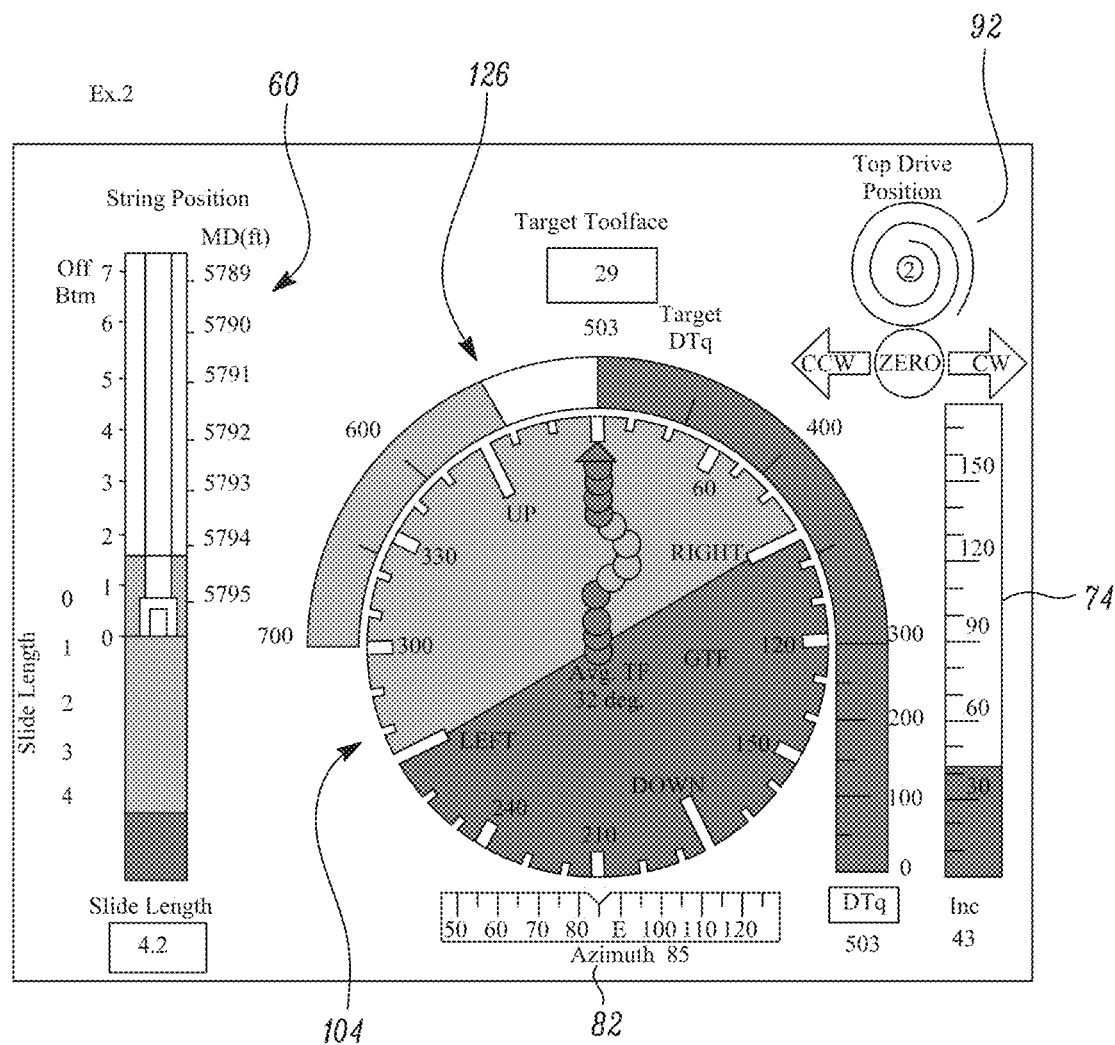
FIG. 12 is still another example display in accordance with an embodiment of the present disclosure.

FIG. 12 is still another example display in accordance with an embodiment of the present disclosure. In this example, the system has exceeded the target control parameter of downhole torque (D Tq) for any number of reasons (formation change, axial stick slip, auto-driller instability). The excess is indicated by the yellow band above and beyond the 12 o'clock target in the curved bar graph of the control parameter display. This circumstance will cause the toolface to walk to the left (CCW) if unchecked. Note that downhole torque is still in command as is indicated by the dark blue color coding and the annunciation at the bottom right. Also, the azimuth has changed five degrees (5.degree.) to the right to eighty five degrees (85.degree.).

Figure 13:
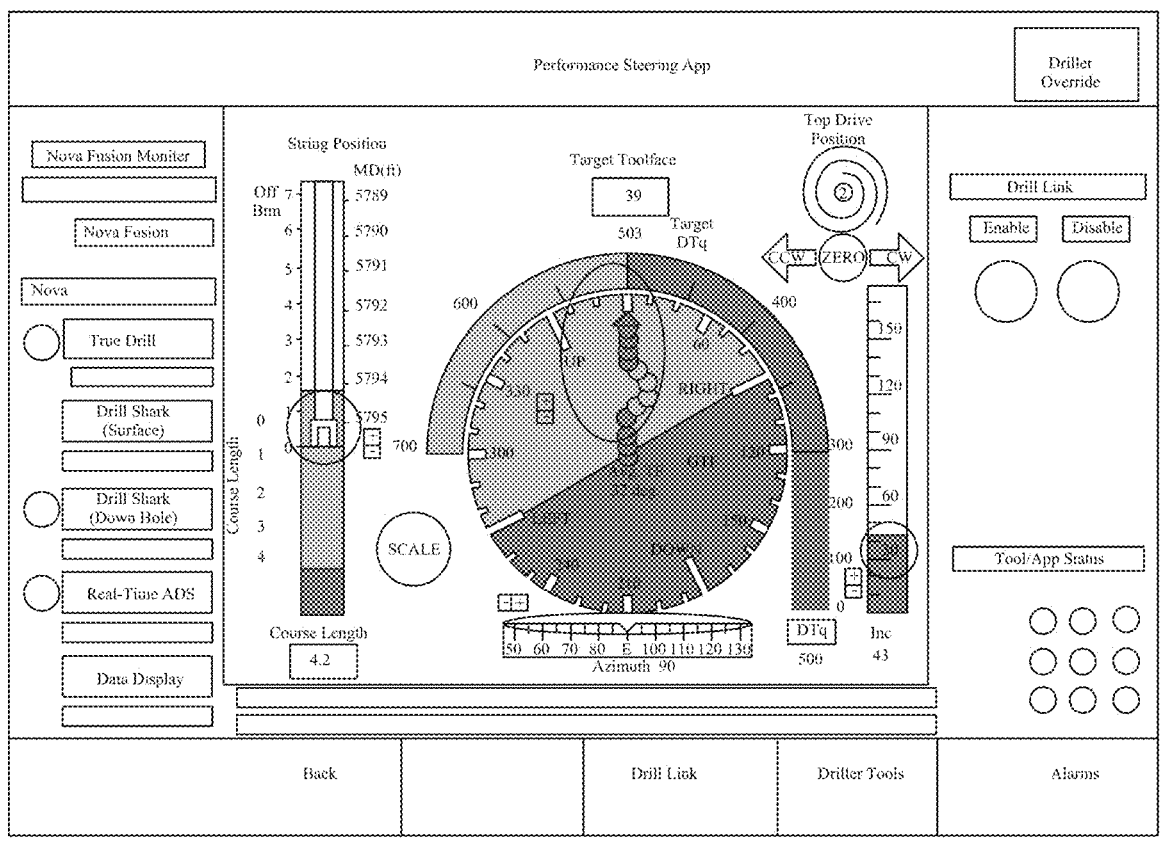
FIG. 13 is still another example display in accordance with an embodiment of the present disclosure.

FIG. 13 is still another example display in accordance with an embodiment of the present disclosure. In an embodiment, the display may include an "On-Screen Zoom" control activated by a "Zoom" pushbutton. Such will be grey when inactive and yellow when active. When active, the normally active Slide Length and Target Toolface points shall be inactive but a highlighted area of the display (as shown in circular call out bubbles in FIG. 13) shall enable a changing respective "Zoom" or scale. In an embodiment, there may be another screen placed on top with transparency of the zoom or scale function for each of the display elements.

This application is a continuation of U.S. application Ser. No. 14/627,581, filed Feb. 20, 2015, titled "DRILLING DIRECT CONTROL USER INTERFACE," which claims priority to, and the benefit of, U.S. Provisional Application No. 62/097,644, filed Dec. 30, 2014, titled "DRILLING DIRECT CONTROL USER INTERFACE," all of which are incorporated by reference herein in their entirety.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

The invention claimed is:

1. A control apparatus for a drilling system with a downhole tool, the control apparatus comprising:
   a display;
   one or more input devices to receive one or more measurements, the one or more measurements including one or more of present depth, present bit position, inclination, azimuth, top drive position, magnetic toolface, gravity toolface, and a target control parameter; and
   one or more control units with access to instructions that, when executed by at least one of the one or more control units, cause the control apparatus to:
      generate, on the display, a top drive position index representing drill pipe rotation,
      generate, on the display, a toolface rosebud graphically illustrating a target toolface and a present toolface at an angle relative to the target toolface, wherein the toolface rosebud is circular and a 12 o'clock position on the toolface rosebud corresponds to the target toolface, and wherein one or more symbols on the toolface rosebud represent historical toolface values; and
      iteratively update, on the display, the top drive position index and the toolface rosebud; and control the drilling system based on a control command, the control command determined based at least in part on information displayed on the display.

2. The control apparatus of claim 1, wherein the top drive position index is shown as a spiral and a number of turns in the spiral represents a number of drill pipe rotations.

3. A control apparatus for a drilling system with a downhole tool, the control apparatus comprising:
a display;
one or more input devices to receive one or more measurements, the one or more measurements including one or more of present depth, present bit position, inclination, azimuth, top drive position, magnetic toolface, gravity toolface, and a target control parameter; and
one or more control units with access to instructions that, when executed by at least one of the one or more control units, cause the control apparatus to:
determine a target toolface;
determine a present toolface based on one or more of the measurements received at the one or more input devices;
generate, on the display, a toolface rosebud graphically illustrating the target toolface and the present toolface at an angle relative to the target toolface, wherein one or more symbols on the toolface rosebud represent historical toolface values;
iteratively update, on the display, the toolface rosebud; and
control the drilling system based on a control command, the control command determined based at least in part on information displayed on the display.

4. The control apparatus of claim 3, wherein the toolface rosebud is switchable between representing magnetic toolface and gravity toolface.

5. The control apparatus of claim 4, wherein the toolface rosebud automatically switches between representing magnetic toolface and gravity toolface.

6. The control apparatus of claim 4, wherein the toolface rosebud defines the directions North, South, East, and West for magnetic toolface and Up, Down, Left and Right for gravity toolface.

7. The control apparatus of claim 3, wherein the toolface rosebud is circular and a 12 o'clock position on the toolface rosebud corresponds to the target toolface.

8. The control apparatus of claim 3, wherein the one or more symbols are arranged in order of recency of the corresponding toolface values.

9. The control apparatus of claim 3, wherein the most recent toolface value is represented by a different symbol than the other historical toolface values.

10. The control apparatus of claim 3, wherein the one or more symbols are visually coded based on an amount of error from the target toolface.

11. The control apparatus of claim 10, wherein the one or more symbols are visually coded by color, wherein a first color corresponds to a first error range and a second color corresponds to a second error range.

12. The control apparatus of claim 3, wherein an indicator on the toolface rosebud displays at least one of a mode of the toolface rosebud or a state of the drilling system.

13. A control apparatus for a drilling system with a downhole tool, the control apparatus comprising:
a display;
one or more input devices to receive one or more measurements, the one or more measurements including one or more of present depth, present bit position, inclination, azimuth, top drive position, magnetic toolface, gravity toolface, and a target control parameter; and
one or more control units with access to instructions that, when executed by at least one of the one or more control units, cause the control apparatus to:
determine a number of drill pipe rotations;
generate, on the display, a top drive position index representing drill pipe rotation, the top drive position index shown as a spiral and a number of turns in the spiral corresponds to the number of drill pipe rotations;
iteratively update, on the display, the top drive position index; and
control the drilling system based on a control command, the control command determined based at least in part on information displayed on the display.

14. The control apparatus of claim 13, wherein the top drive position index includes a digital representation of an integer number corresponding to the number of drill pipe rotations.

15. The control apparatus of claim 13, wherein the top drive position index includes one or more entry controls.

16. The control apparatus of claim 15, wherein the one or more entry controls includes a re-indexing control to reset the number of drill pipe rotations.

17. The control apparatus of claim 15, wherein the one or more entry controls includes a clockwise command control and a counterclockwise command control.

* * * * *